United States Patent [19]

Rauschenfels

[11] 4,094,692
[45] June 13, 1978

[54] PROCESS FOR STABILIZING CEMENT STONE FORMED WITH ALUMINOUS BINDERS

[75] Inventor: Eberhard Rauschenfels, Wiesbaden-Sonnenberg, Germany

[73] Assignee: Dyckerhoff Zementwerke Aktiengesellschaft, Wiesbaden-Amoneburg, Germany

[21] Appl. No.: 757,423

[22] Filed: Jan. 6, 1977

[30] Foreign Application Priority Data

Jan. 10, 1976  Germany ............................... 2600769

[51] Int. Cl.² ............................................... C04B 7/32
[52] U.S. Cl. ..................................... 106/104; 106/314
[58] Field of Search .................. 106/104, 315, 89, 314

[56] References Cited

U.S. PATENT DOCUMENTS

| | | | |
|---|---|---|---|
| 3,663,252 | 5/1972 | Stiglitz et al. ......................... | 106/315 |
| 3,663,286 | 5/1972 | De Barrau ............................ | 106/315 |

*Primary Examiner*—J. Poer
*Attorney, Agent, or Firm*—Burgess, Dinklage & Sprung

[57] ABSTRACT

Process for stabilizing cement stone, formed with binders rich in aluminates by setting with water, against high elevated temperatures and high humidity which comprises adding calcium sulfite to the aluminous binder material prior to setting. In another embodiment of the invention the addition of calcium borate along with the calcium sulfite provided even greater stability both initially and over a period of time. Calcium sulfite formed as a by-product of the waste gas purification of furnaces is the main source of supply for purposes of this invention.

8 Claims, No Drawings

PROCESS FOR STABILIZING CEMENT STONE FORMED WITH ALUMINOUS BINDERS

BACKGROUND OF THE INVENTION

1. Field of the Invention

The invention relates to a process for the stabilization of cement stone which is formed from aluminous cementing material by setting with water against heat and humidity.

2. Descripton of the Prior Art

Contrary to portland cements formed with calcium silicates, alumina cements are principally composed of calcium aluminates mixed with small amounts of silicates, silicoaluminates, ferrites and in some cases titanates.

Alumina cements and other binding agents rich in aluminates are distinguished by fast hardening and fast attainment of stabilities which are far superior to those of portland cements. Hydrated alumina cements have proved to be extremely resistant to water attack and other chemical effects. Mortars, concretes and others, e.g. fibrous materials formed on the basis of aluminous binding agents, undergo a clear destruction after hydration at low temperatures if they are exposed to temperatures of higher than approximately 23° C. This decay becomes evident by losses of strength which resulted therein, for example, that in some countries such as, for instance, the Federal Republic of Germany, alumina cement is no longer permitted for supporting structural parts.

It is well known to those with experience in the field that the heaviest loss of strength is to be expected when the structural parts are at elevated temperatures in air having high humidity. Under water, the decrease in strength is less strongly marked. According to current opinion, the following process is involved: The minerals $CAH_{10}$ and $C_2AH_8$ forming mostly during the normal hydration of alumina cement at temperatures below 23° change to $C_3AH_6,AH_3$ and water at temperatures of above about 23° C (in the formulas $C=CaO, A=Al_2O_3, H=H_2O$). This reaction proceeds during substantial volume decrease of the solid phase, i.e., the cement stone becomes porous during this transformation. In view of the very rapidly proceeding exothermic hydration, large amounts of heat are set free which, in case of larger construction parts, can frequently not be removed quickly enough and thus set in motion the described transformation of $CAH_{10}$ and $C_2AH_8$.

According to the prior art it had been attempted to avoid the described drawbacks by decrease of th water-concrete proportion. By this method there is added to the concrete only an amount of water which is not adequate for complete hydration. However, this procedure leads to mortars which can only be processed with difficulty in view of their low plasticity.

It has also been attempted to prevent formation of the denser tricalcium aluminate hydrates by the addition of calcium carbonate, magnesium carbonate or calcium borates. To date no known measures have succeeded in avoiding the decrease in strength to a sufficient degree.

SUMMARY OF THE INVENTION

Surprisingly, it has now been discovered that the stabilization of cement stone rich in aluminum oxide succeeds to a satisfactory degree by an addition of certain products which accumulate during the purification of furnace flue gas. To wit, calcium sulfite, formed as a by-product of the waste gas purification of furnaces, is added to the aluminous binder material before setting with water, in amounts of between at least 0.2 weight per cent and up to about 10 weight per cent calculated as $CaSO_3$. Calcium borate when additionally added surprisingly enhances the stability of the resultant product even though calcium borate, alone, yields no improvement to stability.

DESCRIPTION OF THE PREFERRED EMBODIMENTS

The invention is therefore directed to the problem of stabilizing cement stone formed with aluminous binding agents through setting with water in such a manner that the necessary compression strengths are obtained and are maintained. According to the invention, such stabilization is achieved thereby by adding to the aluminous binder calcium sulfite resulting as a by-product from exhaust gas purification of furnaces. By aluminous binders there is meant not only ordinary alumina cement and compositions of alumina cement and other binders, but, rather, also other standardized and un-standardized cements and other binding agents on a cement basis, which contain more alumina than commercial portland cements with usually 3 to 8% $Al_2O_3$.

Cement stone is the material resulting from cement and water through hydration, which holds together admixtures such as gravel, sand and flue dust and reinforcing ingredients such as, for instance, steel, wood, glass, plastic, as well as reinforcing ingredients such as steel fillers or fibers such as, for instance, of steel, wood, glass, plastic or carbon. As is known, cement stone is formed during the setting of concretes and mortars. It also results during the hydration of cement-containing suspensions as they are used, for instance, for the filling of spanning tunnels or other hollow spaces also in the ground and furthermore, during the hardening of fibrous, concrete-bonded materials such as asbestos cement and glass fiber cement.

The calcium sulfite waste used according to the instant invention is formed during waste gas purification of furnaces. The desulfurization of waste gasses from furnaces using sulfur-containing fossil fuels has become more and more necessary for reasons of environmental protection. Numerous processes are known for this. Some of them are based on allowing CaO and/or $CaCO_3$ to react with the contaminant gasses. Desulfurization can take place before or after clearing of the exhaust gasses of flying dust. The manner of allowing exhaust gas and the calcium-containing reaction substance to react with one another is varied. For instance, one can conduct the exhaust gas through a ring slot washer in which $Ca(OH)_2$ solution is finely sprayed.

Depending on the process used and the operational condition of the furnace, the products accumulating during the waste gas purification by use of calcium oxide-containing reagents contain, in addition to calcium sulfites, calcium sulfates and calcium carbonates, greatly changing amounts of flying dusts which can, under certain conditions, amount to the principal amount of the waste. In case of good, preliminary purification of flying dust, the waste can consist mostly of the calcium reaction products. Thus, the flue-dust-free portion of these waste materials contain 40 to 90 weight %, mostly 55 to 70 weight %, of calcium sulfite, calculated as anhydrous $CaSO_3$. Additionally, changing amounts of calcium sulfate, e.g. 5 to 20%, and calcium carbonate, for instance 1 to 15%, are present. More-over, such calcium sulfite wastes from the exhaust gas purificaton of furnaces, usable according to the instant invention, can also contain up to 30% calcium sulfate and up to 30% calcium carbonate, in addition to other compounds.

The calcium sulfite is usually present as calcium sulfite semihydrate $CaSO_3 \cdot \frac{1}{2} H_2O$.

The aforementioned calcium sulfite represents a commercial waste product which until now has found no use and whose disposal is extremely difficult because the sulfite constituent is extremely damaging to groundwater. The admixture of calcium sulfite waste according to the invention is added to the aluminous binders in amounts of at least 0.2 weight %, calculated as $CaSO_3$. In general, the effect is obtained by additions of up to 10 weight %. Amounts of 0.2 to 5 weight %, especially 0.4 to 2 weight %, are preferably used.

Surprisingly, with the process according to the invention, stabilizers can be additionally added with the calcium sulfite, which do not enhance stability when added alone, yet added with the calcium sulfite a synergistic effect is obtained. An admixture of calcium borate proved especially advantageous. In addition to the dried calcium sulfite slurry from the flue gas purification, natural or synthetic calcium borates were added in an amount of 0.2 to 5, preferably 0.5 to 2.0 weight % with regard to the aluminous binder. The addition of the calcium sulfite waste and in some cases additional known stabilizing agents can take place at any time prior to the cementing of the binding agent. The stabilizer is, for instance, added in the cement grinder, or it is admixed to the ground cement prior to its insertion into the receiver. Likewise, the addition can take place at any time during mortar and concrete production. The mortars and concretes containing cement stone, which are stabilized in the manner according to the invention, and the fiber-containing materials are extremely stable even under the conditions of relatively high atmospheric moisture and elevated temperature. This also applies in case of high atmospheric moisture.

In the following Examples 1 to 3, a standardized water-binder ratio of 0.5 was used. This was not according to practice and leads to unusually high starting porosity of the cement stone. However, these intensified test conditions were especially revealing since the high initial porosity of the alumina cement stone accelerated its thermal destruction exceedingly in view of the improved migration of all materials.

In addition, because of the high proportion of water in the fresh mortar, the thermal destruction of the alumina stone was also promoted in view of the resulting calcium hydrate phases, as was explained above with regard to the prior art.

EXAMPLE 1

Prisms measuring 4×4×16 cm were produced from cement and a dried, flue dust-poor calcium sulfite slurry from the flue gas purification of a power plant furnace and standard sand at a constant water-binder ratio of 0.5 according to DIN 1164. White alumina cement (Secar Lafarge) was used as cement. The calcium sulfite slurry was analyzed as follows (as usual, existing water of hydration was separately calculated as water):

| Component | Weight % |
|---|---|
| $SiO_2$ | 3.2 |
| $Al_2O_3$ | 2.0 |
| $TiO_2$ | 0.08 |
| $Fe_2O_3$ | 0.29 |
| CaO | 40.2 |
| MgO | 1.1 |
| $Na_2O$ | 0.28 |
| $K_2O$ | undetectable |
| $P_2O_5$ | 0.02 |
| $SO_2$ | 33.5 |
| $SO_3$ | 5.1 |
| $CO_2$ | 4.2 |
| C org. | 1.3 |
| $H_2O$ | 7.5 |
| F | 0.075 |
| Cl | 0.07 |
| Mn | 0.004 |
| Zn | 0.006 |
| Cu | 0.003 |
| $NH_3$ | <0.01 |

The tested samples contained the following amount of cement and admixtures:
(a) 100 weight % alumina cement
(b) 99.5 weight % alumina cement and 0.5 weight % of calcium sulfite slurry, calculated as $CaSO_3 \cdot \frac{1}{2} H_2O$
(c) 99.0 weight % alumina cement and 1.0 weight % calcium sulfite slurry, calculated as $CaSO_3 \cdot \frac{1}{2} H_2O$.

The prisms were stored for 24 hours at 20° C and 100% relative atmospheric moisture in a cabinet, then stripped from the forms and subsequently subjected to the following storage conditions:
1.1: Storage after the first day in water at 20° C.
1.2: Storage after the first day for 6 days in water at 20° C, from the eighth day in water at 30° C.

In each case, a prism stored in this manner was tested after 1, 7 and 28 days compression strength and compared to prisms which were produced without additional substances, but in otherwise exactly the same manner. The values are summarized in Table 1:

Table 1

| Test | 1.1 | | | 2.1 | | |
|---|---|---|---|---|---|---|
|  | a | b | c | a | b | c |
| Storage conditions | without thermal attack | | | with thermal attack | | |
| Stabilizer added: Calcium sulfite slurry (weight %) | — | 0,5 | 1,0 | — | 0,5 | 1,0 |
| Aging time (days) | Compression strengths (kp/cm²): | | | | | |
| 1 | 398 | 423 | 399 | 410 | 372 | 394 |
| 7 | 807 | 640 | 645 | 852 | 651 | 681 |
| 28 | 1005 | 793 | 821 | 406 | 796 | 836 |

It is evident from the table that cement stone produced according to the instant process has immediate high compression strength values in each case comparable to those of pure cement.

In the instance of the mortar from cement without the aid of stabilizers, a rapid decrease in compression strength sets in after the seventh day if the samples are stored at elevated temperature. However, the mortars stabilized in accordance with the instant invention have in each case the same values of compression strength which, of course, depend on the time but not on the temperature.

EXAMPLE 2

Under test conditions similar to those in Example 1, similar cement of another lot was tested alone and mixed with the following additives:

(a) 100 weight % alumina cement
(b) 99.0 weight % alumina cement
  1.0 weight % of calcium sulfite waste dried at 50° C, calculated as $CaSO_3 \cdot \frac{1}{2} H_2O$
(c) 98.0 weight % alumina cement
  1.0 weight % calcium sulfite waste dried at 50° C, calculated as $CaSO_3 \cdot \frac{1}{2} H_2O$
  1.0 weight % synthetic $Ca(BO_2)_2 \cdot 2 H_2O$ (calcium meta-borate, commercial quality, Riedel-de Haen No. 11 618).

As in Example 1, the prisms were first stored for 24 hours at 20° C and 100% relative humidity in a cabinet and then stripped from the forms.

The samples were then stored as in Example 1 in water at 20° C for 6 days. The subsequent storage took place under substantially stronger conditions than in Example 1: From the eighth day on, the samples were stored at 40° C in air with approximately 100% relative atmospheric moisture. The resulting compression strength values are shown in Table 2.

Table 2

| Test | 2.1 | | |
|---|---|---|---|
| | a | b | c |
| Added stabilizer: | | | |
| Calcium sulfite slurry (weight %) | — | 1.0 | 1.0 |
| Calcium borate (wt. %) | — | — | 1.0 |
| Aging time (days) | Compression strengths (kp/cm²) | | |
| 1 | 403 | 378 | 471 |
| 7 | 778 | 345 | 724 |
| 28 | 360 | 770 | 924 |

The figures of Table 2 illustrate that an addition of calcium borate known per se to the calcium sulfite-containing waste according to the invention yields substantially higher stabilities beginning with the first day.

EXAMPLE 3

Under the same test conditions as in examples 1 and 2, similar cement of the lot of example 2 was tested alone and mixed with the following additives:
(a) 100, weight % alumina cement
(b) 99.0 weight % alumina cement and 1.0 wt. % calcium sulfite waste dried at 50° C, calculated as $CaSO_3 \cdot \frac{1}{2} H_2O$
(c) 98.0 weight % alumina cement
  1 weight % calcium sulfite waste dried at 50° C, calculated as $CaSO_3 \cdot \frac{1}{2} H_2O$
  1.0 weight % synthetic $Ca(BO_2)_2 \cdot 2 H_2O$
(d) 99.0 weight % alumina cement
  1.0 weight % synthetic $Ca(BO_2)_2 \cdot 2 H_2O$.

In the same manner as in Examples 1 and 2, the prisms were first stored for 24 hours at 20° C and 100% relative atmospheric moisture in the cabinet and then stripped from the forms. Contrary to Examples 1 and 2, the samples were stored from the second day on at 40° C in air with approximately 100% relative atmospheric moisture. This type of storage was still stronger than that used in Example 2 because no time was allowed to the cement for an expecially extensive hydration below a temperature of about 23° C. Therefore, a portion of the primary cement minerals hydrates under very unfavorable conditions. The resulting compressing strengths can be derived from Table 3.

Table 3

| Test | 3.1 | | | |
|---|---|---|---|---|
| | a | b | c | d |
| Stabilizer added: | | | | |
| Calcium sulfite slurry (wt. %) | — | 1.0 | 1.0 | — |
| Calcium borate (wt. %) | — | — | 1.0 | 1.0 |
| Aging time (days) | Compression strengths (kp/cm²) | | | |
| 1 | 397 | 394 | 485 | 413 |
| 7 | 612 | 586 | 768 | 677 |
| 28 | 317 | 678 | 840 | 378 |

The values of Table 3 show that an addition of calcium borate alone does not stabilize under the strict storage conditions mentioned. By itself it also does not lead to the high compression strength value after one day, such as the combination of calcium sulfite waste and calcium borate shows. High initial stability is, however, an especially important characteristic of alumina cements, which distinguishes it from cheaper portland cement.

While calcium sulfite used in the foregoing examples and in the specification is described as a waste product emanating from furnace gas purification processes, it is to be understood that commercially available synthetically made calcium sulfite is useable as well. However, the former source of the calcium sulfite would produce a tremendous gain to world ecology since it has been, prior to the present invention, a very difficult waste product to remove from the environment.

It will be appreciated that the instant specification and examples are set forth by way of illustration and not limitation, and that various modifications and changes may be made without departing from the spirit and scope of the present invention.

What is claimed is:

1. In a process wherein a cement stone-forming material is mixed with a binder rich in aluminates and with water, and is permitted to set to cement stone, the improvement which comprises adding calcium sulfite to said binder prior to said setting in an amount of at least 0.2 weight % up to about 10 weight % calculated as $CaSO_3$ based on the weight of said binder.

2. The process according to claim 1, wherein said calcium sulfite is added in an amount between about 0.2 and 5 weight %.

3. The process according to claim 1, wherein calcium borate is added in an amount between about 0.2 and 5.0 weight % based on the weight of said aluminous binder.

4. Cement stone produced by the process of claim 1.

5. The process according to claim 2, wherein said calcium sulfite is added in an amount between about 0.4 and 2 weight %.

6. The process accoding to claim 3, wherein said calcium borate is added in an amount between about 0.5 and 2 weight %.

7. The process according to claim 1, wherein said calcium sulfite is obtained as waste from purification of furnace flue gases.

8. An aluminous binder suitable for forming cement stone containing calcium sulfite waste obtained from purification of furnace flue gases in an amount of at least 0.2 weight % up to about 10 weight % calculated as $CaSO_3$.

* * * * *